Nov. 23, 1954     L. E. NORTON     2,695,361
PULSE COMPARISON SYSTEM AND METHOD
Filed Dec. 1, 1950     8 Sheets-Sheet 1
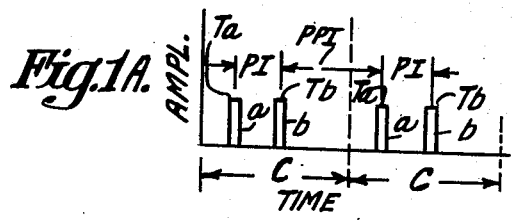
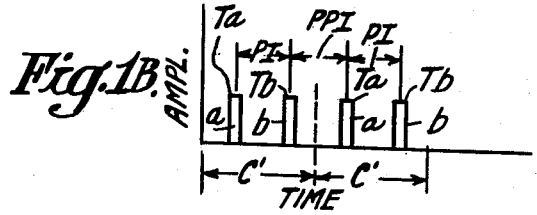
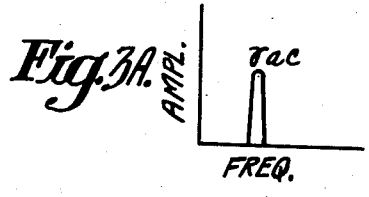
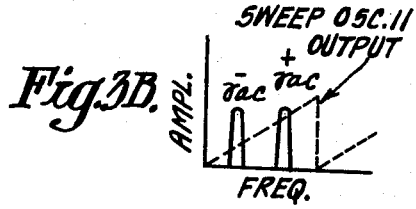
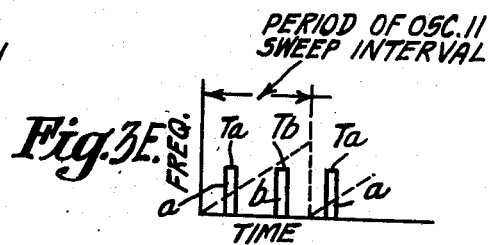
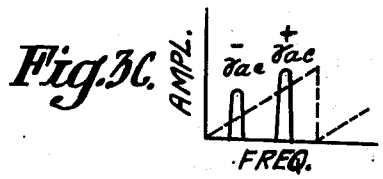
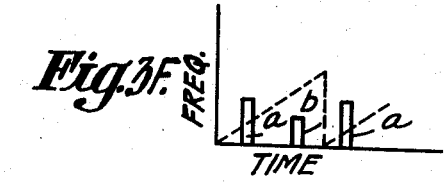
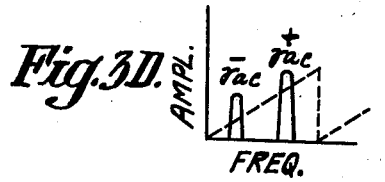
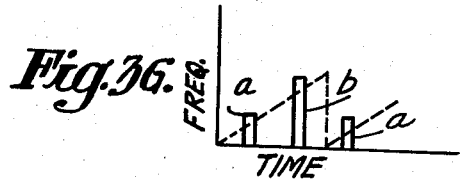
INVENTOR
Lowell E. Norton
BY
ATTORNEY

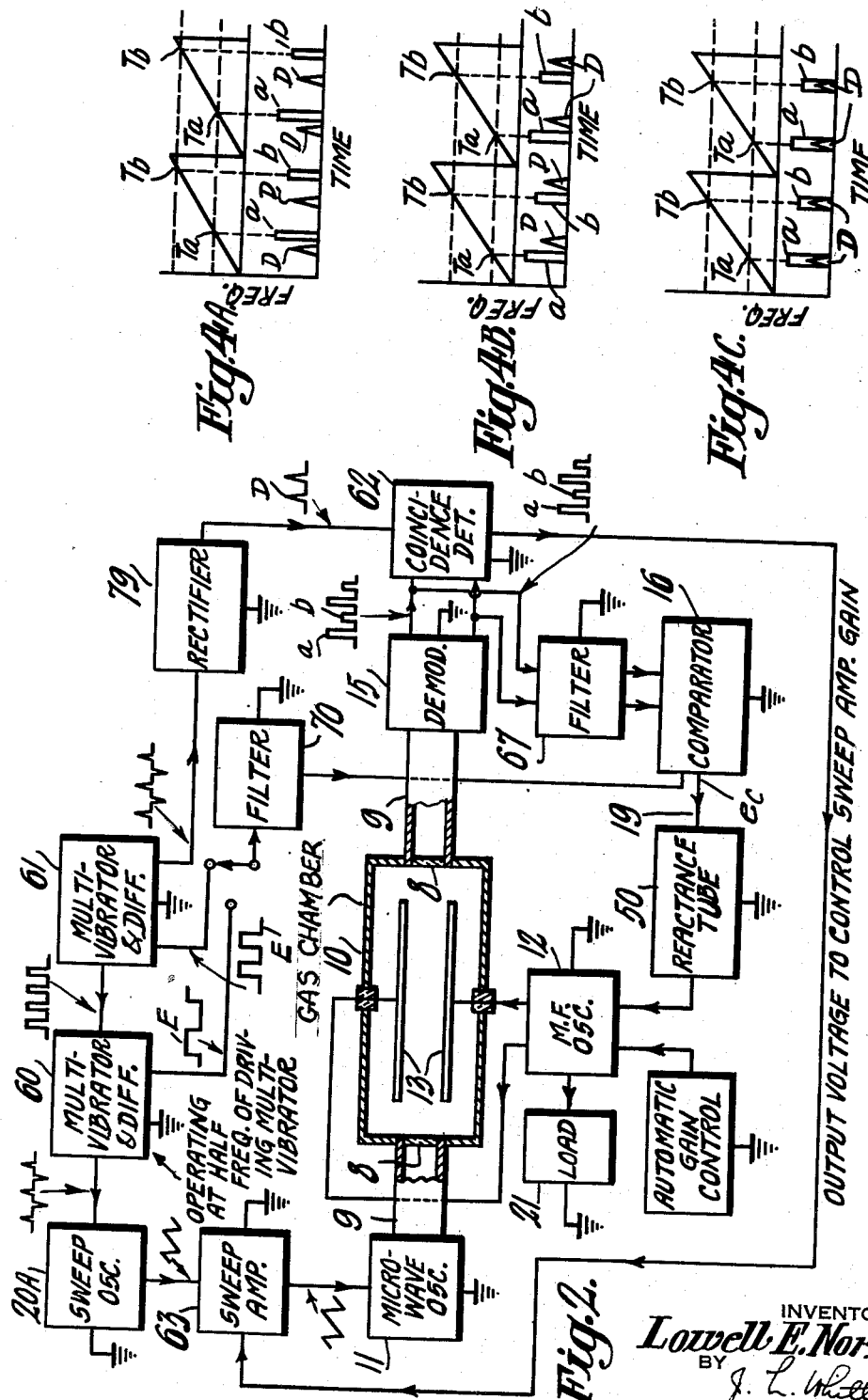

INVENTOR
Lowell E. Norton
BY
ATTORNEY

Nov. 23, 1954 L. E. NORTON 2,695,361
PULSE COMPARISON SYSTEM AND METHOD
Filed Dec. 1, 1950 8 Sheets-Sheet 4

Fig.5A.  $E_B$ ANODE OF TUBE 73

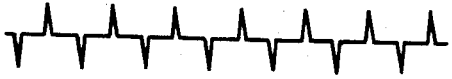
Fig.5B. DIFFERENTIATED OUTPUT OF FIG. 5A.

Fig.5C. $E_g$ ANODE OF TUBE 74

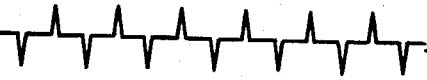
Fig.5D. DIFFERENTIATED OUTPUT OF FIG. 5C.

Fig.5E. $E_B$ ANODE OF TUBE 81

Fig.5F. DIFFERENTIATED OUTPUT OF FIG. 5E.

Fig.5G. POTENTENTIAL ACROSS C5

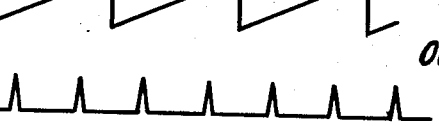
Fig.5H. OUTPUT OF 15. INTERVAL C=C'

Fig.5J. OUTPUT OF 15 SWEEP INTERVAL TOO GREAT

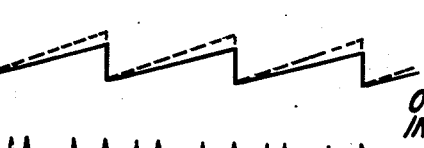
Fig.5K. OUTPUT OF 15 SWEEP INTERVAL TOO SMALL

INVENTOR
Lowell E. Norton
BY
ATTORNEY

Nov. 23, 1954  L. E. NORTON  2,695,361
PULSE COMPARISON SYSTEM AND METHOD
Filed Dec. 1, 1950  8 Sheets-Sheet 5

INVENTOR
Lowell E. Norton
BY J. L. Whittaker
ATTORNEY

Nov. 23, 1954 — L. E. NORTON — 2,695,361
PULSE COMPARISON SYSTEM AND METHOD
Filed Dec. 1, 1950 — 8 Sheets-Sheet 7

INVENTOR
Lowell E. Norton
BY
ATTORNEY

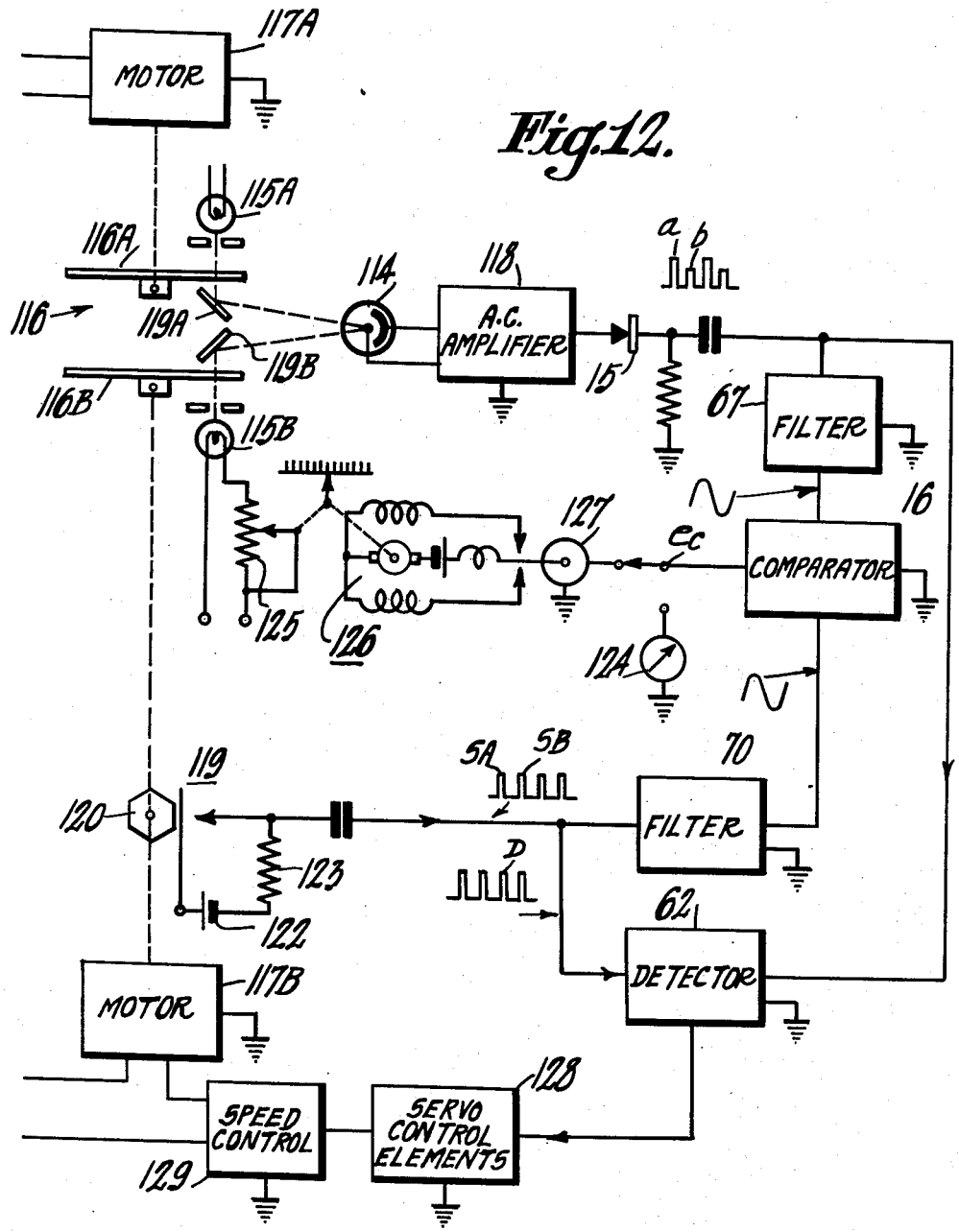

United States Patent Office 2,695,361
Patented Nov. 23, 1954

2,695,361

PULSE COMPARISON SYSTEM AND METHOD

Lowell E. Norton, Princeton, N. J., assignor to Radio Corporation of America, a corporation of Delaware Application December 1, 1950, Serial No. 198,541

16 Claims. (Cl. 250—36)

This invention relates to methods and systems for comparing the relative amplitude of paired non-coincident electrical pulses which periodically recur in successive observation intervals as in measuring or control systems involving periodic sweeping or switching for determining differences in frequency, field intensity, direction absorption and the like.

In accordance with the present invention and in avoidance of gating, the repeating observation interval is so regulated or selected that the time interval between the paired pulses is equal to the time interval between successive pairs and from the resulting paired pulse waveform is selected either, (a) a Fourier component whose phase-angle or, (b) a Fourier component whose magnitude varies as a function of the relative amplitude of the pulses. In either case the difference in phase, or the difference in magnitude, between the selected Fourier component and time-standard pulses corresponding with or derived from the repetition frequency of the observation interval is a measure, in sense and magnitude, of the departure from unity ratio of the amplitudes of the pulses.

More particularly and further in accordance with the invention, the observation period is automatically controlled to maintain equality of the aforesaid time intervals by a servosystem responsive to the output of a phase-comparator upon whose input circuits are respectively impressed the paired pulses and time-standard pulses corresponding with or derived from the repetition frequency of the observation interval. For control of frequency or other variable affecting the relative amplitude of the pulses, the departure from unity ratio of the pulse amplitudes is automatically controlled by a second servo-system responsive to the output of a phase-comparator upon whose input circuits are respectively impressed the aforesaid selected Fourier component of the paired pulse waveform and time standard pulses corresponding with or derived from the repetition frequency of the observation interval.

The invention further resides in methods and systems having the features of novelty and utility hereinafter described and claimed.

This application is in part a continuation of my copending applications Serial Nos. 148,481 and 194,442.

For a more detailed understanding of the invention and for illustration of systems embodying it, reference is made to the accompanying drawings in which:

Figs. 1A and 1B are explanatory figures referred to in discussion of underlying principles of the invention;

Fig. 2 is a block diagram of a system for stabilizing the frequency of a radio-frequency oscillator;

Figs. 3A–3G are explanatory figures referred to in discussion of "resonant modulation" pulses of Fig. 2;

Figs. 4A–4C are explanatory figures referred to in discussion of the observation interval control of Fig. 2;

Figs. 5a–5k, are explanatory graphs of waveforms throughout the circuits of Figs. 5 and 6 respectively;

Fig. 12 schematically illustrates another system involving comparison of the relative amplitude of paired non-coincident pulses.

Figure 5:
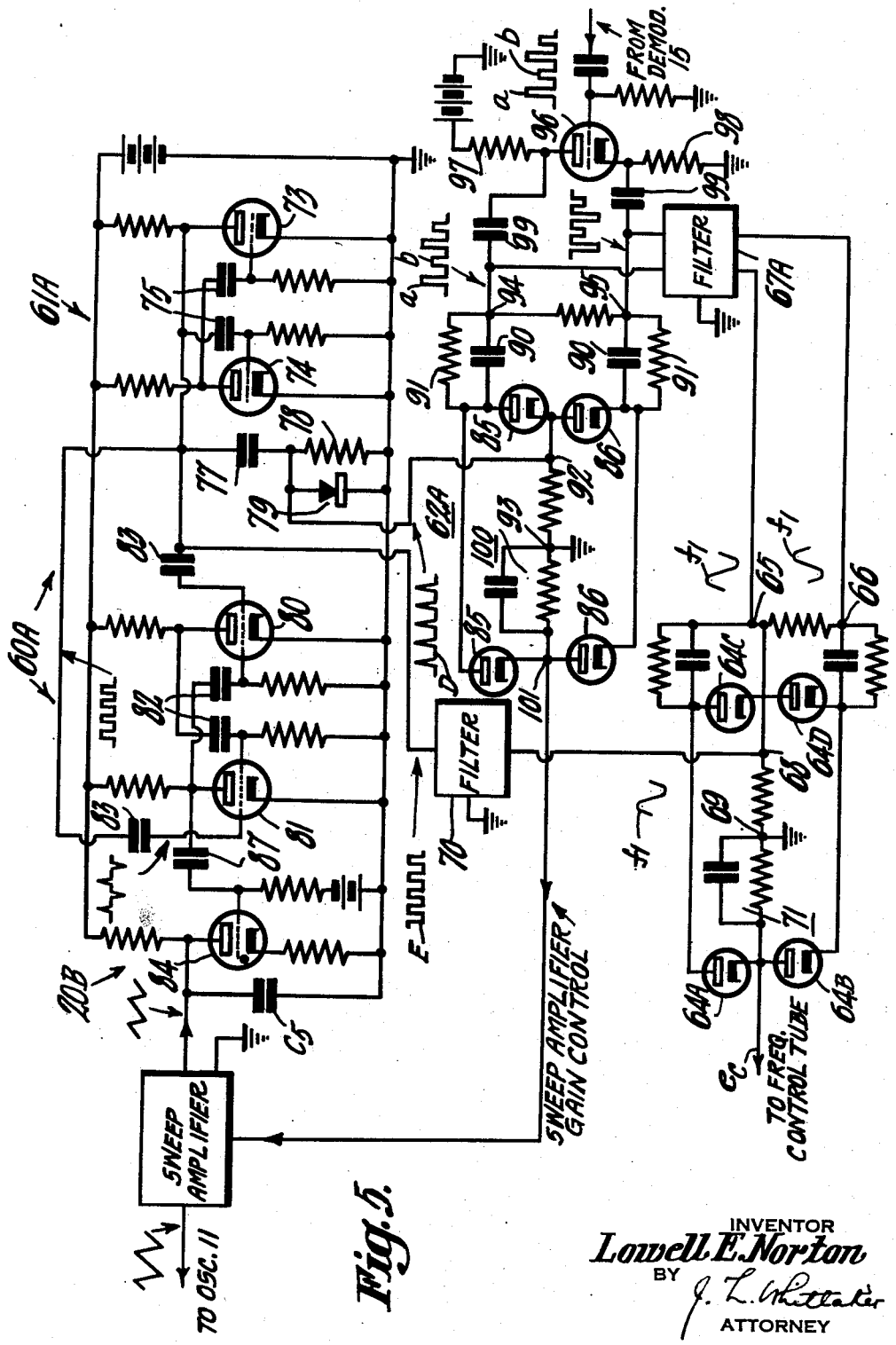
Figs. 5 and 6 are circuit diagrams of two modifications of the system of Fig. 2.

As will later appear in discussion of particular methods and system utilizing the invention, it is necessary to determine the magnitude equality condition of two non-coincident events without ambiguity of the sense of departure from such condition. The events $a$ and $b$, Figs. 1A, 1B, may occur at times $T_a$ and $T_b$ in each of a succession of observation intervals $C$ and may be of equal amplitude or either event may be greater than the other. As shown in Fig. 1A, the interval $PI$, the time-difference from $T_a$ to $T_b$, is less than the interval $PPI$, the time difference from $T_b$ of one pair of events to $T_a$ of the next pair of events; the times of occurrence of the events during the observation intervals may also be such that $PI$, the interval between the paired events, is greater than $PPI$, the interval between successive pairs of events. For reasons which later appear, it is necessary for the purposes of this invention that the observation interval be such that, as indicated by observation interval $C'$ of Fig. 1B, the interval $PI$ between the paired events be equal to the interval $PPI$ between the successive pairs of events or otherwise expressed: $T_a - T_b = T_b - T_a$, from which the special time interval $C'$ is $C' = 2(T_a - T_b)$.

The events $a$ and $b$ may be, for example, paired "resonance-modulation" gas absorption lines as in copending application Serial No. 148,481, two absorption lines of a composite gas sample, paired side-band gas absorptions as in copending application Serial No. 194,442, direction-finding signals, responses of resonators, or any other paired non-coincident events existent as, or convertible to, electrical pulses of corresponding amplitude.

In all of the various exemplary methods and systems herein described, there is produced an output, such as a voltage, which is zero when magnitude $a$ equals magnitude $b$, which is not zero when the ratio between magnitudes $a$ and $b$ is not unity, and which changes algebraic sign as that ratio changes between values respectively greater and lower than unity and vice versa. In brief tabular form for $a = b$ the output is zero for $a \neq b$ the output is not zero for $\frac{a}{b} > 1$ the output is positive (or negative)

for $\frac{a}{b} < 1$ the output is negative (or positive)

Assuming that the pulses are flat-topped and rectangular, as they may be if necessary by utilization of a suitable shaping network, the Fourier series corresponding with the paired pulse waveform for the period $T_a - T_b$ (with $PI = PPI$ and for equal or unequal amplitudes of pulses $a$, $b$) may be expressed as:

(1) $e = E_0 + A_1 \sin B + A_2 \sin 2B \ldots + A_n \sin nB$
$\quad + D_1 \cos B + D_2 \cos 2B \ldots + D_n \cos nB$ (2) $e = E_0 + F_1 \cos (B + \alpha_1) + F_2 \cos (2B + \alpha_2)$
$\quad \ldots + F_n \cos (nB + \alpha_n)$ where $B$ is the fundamental angular frequency $f_1$ corresponding with the period $T_a - T_b$ and phase angle $\alpha$ is a function of the magnitudes and duration of the pulses.

The coefficients of the fundamental terms of Equation 2 are as follows:

(3) $$E_0 = \frac{\delta}{4\pi}(a+b)$$

Where $\delta$ = pulse duration (fixed)
$a, b$ = pulse amplitudes (variable)

(4) $$A_1 = \frac{-\left(\cos \frac{\delta}{2} - 1\right)(a-b)}{\pi}$$

(5) $$D_1 = \frac{\sin \frac{\delta}{2}(a+b)}{\pi}$$

from which the coefficient for the term of the fundamental frequency $f_1$ is $$(6) \quad F_1 = \sqrt{\left[\frac{-(\cos \delta/2 - 1)(a-b)}{\pi}\right]^2 + \left[\frac{\sin \frac{\delta}{2}(a+b)}{\pi}\right]^2}$$

and $$(7) \quad \alpha_1 = \tan^{-1}\left[\frac{\left(\cos \frac{\delta}{2} - 1\right)(a-b)}{\sin \frac{\delta}{2}(a+b)}\right]$$

Now expressing the magnitude of pulse $b$ in terms of pulse $a$ $$(8) \quad b = a(1+\Delta)$$

where $\Delta$ = incremental difference ($+$ or $-$)

The tangent of the phase angle $\alpha_1$ is $$(9) \quad \tan \alpha_1 = -\left(\frac{\cos \frac{\delta}{2} - 1}{\sin \frac{\delta}{2}}\right)\left(\frac{\Delta}{2+\Delta}\right)$$

For cases where the pulses are not greatly different in amplitude, the tangent of the phase angle is, to a close approximation, $$(10) \quad \tan \alpha_1 \cong -\left(\frac{\cos \frac{\delta}{2} - 1}{\sin \frac{\delta}{2}}\right)\left(\frac{\Delta}{2}\right)$$

If $b$ is near enough $a$, then $\alpha_1$ is small enough so that $$\tan \alpha_1 \cong \alpha_1$$

and with good approximation $$(10a) \quad \alpha_1 \cong -\frac{\cos \delta/2 - 1}{\sin \delta/2} \frac{\Delta}{2}$$

In brief, the significant relationship is that the phase angle $\alpha_1$ of the fundamental frequency component $f_1$ varies as $\Delta$, is zero when the amplitude difference $\Delta$ of the pulses is zero, and changes in sign with change in sense of the amplitude difference, so long as the special observation interval $C'$ is maintained.

By comparing the phase of this selected Fourier component of the waveform with respect to a fixed phase reference, the relative amplitude of the pulses $a$ and $b$ is determined and without ambiguity as to which pulse is the larger in amplitude. Exemplary systems utilizing this method of determining the relative amplitude of paired non-coincident pulses are later herein described: another method involving a different Fourier component is now described.

The coefficients $A_1$ and $D_1$ of Equation 1 where $B$ is now the lowest frequency term associated with the period $2(T_a - T_a) = (T_a - T_b) + (T_b - T_a)$ are $$(11) \quad A_1 = \frac{1}{\pi}\left[a[\cos B]_0^{\frac{\delta}{2}} + b[\cos B]_{\pi-\frac{\delta}{2}}^{\pi+\delta/2} + a[\cos B]_{2\pi-\frac{\delta}{2}}^{2\pi}\right] = 0$$

$$(12) \quad D_1 = \frac{2}{\pi}(a-b) \sin \frac{\delta}{2}$$

The coefficient $F_1$ of Equation 2 is therefore $$(13) \quad F_1 = \sqrt{A_1^2 + B_1^2}$$

but since $A_1 = 0$ (Equation 11)

$$(14) \quad F_1 = B_1$$

Also since $\alpha_1$ is the angle whose tangent is $$\left(-\frac{A_1}{B_1}\right)$$

and $A_1 = 0$, then $\alpha_1 = 0$.

Hence, the coefficient of the term associated with the frequency $f_2$ of the period $$2(T_a - T_a) = (T_a - T_b) + (T_b - T_a)$$

is $$(15) \quad F_1 = \left[\frac{2}{\pi}(a-b) \sin \frac{\delta}{2}\right] = \left[\frac{-2\Delta a}{\pi} \sin \frac{\delta}{2}\right]$$

where $b$ differs from $a$ by the relation $$b = a(1+\Delta)$$

In brief, the significant relationship here is that the amplitude of the fundamental frequency component $f_2$ varies as $\Delta$, is zero when the amplitude difference $\Delta$ of the pulses is zero, and changes in sign with change in sign of the amplitude difference.

By comparing the sign of this selected Fourier component of the waveform with respect to a fixed phase reference, the relative amplitude of pulses $a$ and $b$ is determined and without ambiguity as to which pulse is the larger. Exemplary systems utilizing this method of determining the relative amplitude of paired coincident pulses are later herein described.

For pulse shapes other than flat-topped and rectangular, it is only necessary, as will be understood by those skilled in the art, to use the corresponding Fourier series to determine which frequency component of the waveform should be selected in accordance with either of the foregoing methods as a measure of the relative amplitude of the paired non-coincident pulses.

In Fig. 2 is shown a frequency-control system involving amplitude-comparison of paired non-coincident pulses which may utilize either of the aforesaid Fourier components. In brief, there is confined in chamber 10, at suitably low pressure, a body of gas, such as OCS (carbonyl sulphide) having at least three permitted energy states of its molecule and exhibiting selective absorption at a microwave transition frequency $\gamma_{ac}$, Fig. 3A. The windows 8 of the chamber are of quartz, mica or other material transparent to microwave energy. The microwave oscillator 11 is frequency-modulated repeatedly to sweep over a frequency-range including frequency $\gamma_{ac}$. In addition to the microwave field, the gas is also subjected to a lower frequency field whose frequency MF is that of oscillator 12 and which when of desired value corresponds with a lower transition frequency $\gamma_{ab}$ of the gas: about 40 megacycles for OCS. This lower frequency field is applied by electrodes 13, 13 within and insulated from the walls of chamber 10. The microwave energy is supplied to the chamber 10 by a waveguide 9 or equivalent transmission line.

With both fields concurrently applied to the gas, the $\gamma_{ac}$ line is split, as shown in Figs. 3B, 3C and 3D into two absorption lines at frequencies $\gamma_{ac}^+$, $\gamma_{ac}^-$. This phenomenon of "resonant modulation" is more fully discussed in my aforesaid copending application Serial No. 148,481. It here suffices to say that for each sweep cycle of oscillator 11, the output of demodulator 15, which rectifies the microwave energy unabsorbed by the gas, is a pair of non-coincident pulses $a$ and $b$ (Figs. 3E, F, G) having like polarity. These pulses are of equal amplitude (Figs. 3B, 3E) when the oscillator 12 is operating at the correct frequency but differ in magnitude for deviations from that frequency, pulse $a$ being the greater when the frequency MF is low (Figs. 3C, 3F), and pulse $b$ being the greater when the frequency MC is high (Figs. 3D, 3G). The greater the frequency deviation, the greater the difference in pulse amplitudes and the greater the departure from unity of the relative amplitude of the pulses.

As indicated in Fig. 4A, the frequency range swept by the frequency-modulated microwave oscillator 11 may be such that the time-spacing between the paired output pulses $a$, $b$ of the demodulator 15 is greater than the time-spacing between the successive pairs of pulses; or, as indicated in Fig. 4B, the swept microwave frequency range may be such that the time-spacing between the paired pulses is less than the time spacing between successive pulse pairs. As explained in discussion of Fig. 1A, in both of these cases there is no Fourier component of the paired pulse wave-form which varies as a function of the relative amplitude of the pulses $a$ and $b$.

An arrangement for automatically maintaining equality of the time-spacing between pulse pairs and paired pulses, which equality is required (as discussed in connection with Fig. 1B and Equations 1–15) for utilization of a Fourier component of the pulse waveform in determination of the relative amplitude of pulses $a$, $b$, is now described.

Referring to Fig. 2, the sweep oscillator 20A which provides the frequency-modulating signal for the microwave oscillator 11 may be a sawtooth wave generator which is periodically triggered by a multivibrator 60 for initiation of each sweep cycle. The multivibrator 60 is in turn triggered by a second multivibrator 61 whose pulse repetition rate is twice that of multivibrator 60.

For each cycle of the sweep oscillator, the output of demodulator 15 is a pair of non-coincident pulses $a$ and $b$ whose relative amplitude, as explained in discussion of Figs. 3E, 3F and 3G, is a measure of the frequency deviation of oscillator 12 provided their proper time-spacing is maintained. The repeating series of paired pulses is impressed upon one input circuit of a coincidence detector 62, one suitable form of which is later specifically described. Upon the other input circuit of detector 62 is impressed a series of phase reference pulses D. The reference pulses D are equally spaced in time and have a repetition rate which is twice the sweep frequency and equal to the repetition frequency of the paired gas-absorption pulses.

When as shown in Fig. 4C, the sweep range is such that the interval $T_a - T_b$ between the paired absorption line pulses $a$, $b$ is equal to the interval $T_b - T_a$ between successive pairs of pulses, each of pulses $a$, $b$ occurs simultaneously with a phase-reference pulse D. Under this circumstance, the output of the coincidence detector 62 is zero. When, however, the interval $T_a - T_b$ is greater than the interval $T_b - T_a$ (Fig. 4A), the reference pulses D each occur earlier in the observation cycle or interval than the corresponding pulse $a$ or $b$. In this case, the output of the coincidence detector as applied for gain control of the sweep amplifier 63 is of such sense to increase the sweep range until it closely approximates that of Fig. 4C. Conversely, if the interval $T_a - T_b$ is less than the interval $T_b - T_a$ (Fig. 4B), the output of the coincidence detector is of reverse polarity or sense and reduces the gain of sweep amplifier 20A until the sweep range closely approximates that of Fig. 4C.

By the servo system including coincidence detector 62, the observation interval for monitoring of the frequency of oscillator 12 is maintained at that special value $C' = 2(T_a - T_b) = 2(T_b - T_a)$ for which a selected Fourier component of the pulse waveform $a$, $b$ has a characteristic, either phase angle or magnitude, which is zero for equality of the gas-absorption pulses $a$, $b$ and when not zero is of polarity and amplitude corresponding with deviation of the relative pulse amplitude from unity.

For automatic control of the frequency of oscillator 12, there may be provided a reactance tube 50 whose frequency-control voltage is the output of a phase-comparator 16, exemplary types of which are later specifically described. Upon one input circuit of phase-comparator 16 is impressed that Fourier component of the pulse output of demodulator 15 which is selectively passed by the filter 67. For utilization of the relationship expressed in Equation 10, or 10a the circuit parameters of filter 67 are chosen selectively to pass the frequency $f_1$ associated with the period $(T_a = T_b)$; for utilization of the relationship expressed in Equation 15, the circuit parameters of filter 67 are chosen selectively to pass the frequency $f_2$ associated with the period $(T_a - T_b) + (T_b - T_a) = 2(T_a - T_b)$. Upon the input circuit of phase-comparator 16 is impressed a series of phase-reference pulses having the same frequency ($f_1$ or $f_2$) as the output of filter 67: these phase-reference pulses may be selected by filter 70 from one or the other of the multivibrators 60, 61 or from differentiating circuits associated therewith.

In both cases, when the paired non-coincident pulses $a$, $b$, are of equal amplitude, the output voltage of phase-comparator 16 is zero and the frequency-control voltage of the reactance tube 50, or equivalent, remains unchanged. When there is departure from unity ratio of the amplitudes of pulses $a$ and $b$, the output voltage of phase-comparator 16 is of corresponding sense to vary the frequency-control voltage of reactance tube 50 in proper direction to minimize the frequency-deviation of oscillator 12. Thus, the second servo system including phase-comparator 16 matches the frequency of oscillator 12 to the lower transition frequency $\gamma_{ab}$ of the gas standard.

For more detailed description of a system generically represented by Fig. 2 and utilizing the relationship of Equations 1 to 10, reference is now made to Fig. 5 in which groups of components corresponding with blocks in Fig. 2 are identified by the same reference numeral with change or addition of a suffix letter.

The time interval $(T_b - T_a)$ between successive pairs of pulses $ab$, $ab$ is maintained equal to the time-interval $(T_a - T_b)$ between the paired pulses $a$, $b$ by the coincidence detector 62A, so that the difference in amplitude of the paired pulses can be measured by measuring the phase difference between the fundamental Fourier term $f_1$ derived from the paired pulses $a$, $b$ and the fundamental Fourier term $f_1$ derived from the time-standard pulses D.

Operation of Fig. 5 will be more easily understood by referring to Figs. 5a through 5k which show potentials appearing at important elements in the circuit.

The amplitude comparator may be any suitable type of phase-comparator: specifically as shown in Fig. 5, the comparator 16D may comprise a rectifier network, including diodes 64A–64D or equivalent, having input terminals 65, 66 upon which are impressed, through filter 67A the proper Fourier component of the pulse output of demodulator 15. The filter 67 favors passage of the fundamental frequency term of Equation 3 at frequency $f_1$ (which is twice the repetition frequency of sweep oscillator 20B) and attenuates or excludes passage of the higher order frequency terms: this filter is also preferably of type which produces a substantially sinusoidal output waveform. Upon the other pair of input terminals 68, 69 of comparator 16D is impressed, through filter 70A, the output of the double frequency multivibrator 61A. This filter selectively passes the fundamental frequency $f_1$ of the multivibrator pulses and suppresses or excludes the high order frequencies.

When the inputs to comparator 16D are in phase, which occurs only when the resonant-modulation pulses $a$, $b$ are of equal amplitude, the combined output of the rectifiers 64A–64D, as appearing across the integrating network 71, is zero. When the inputs are not in phase, as occurs when the paired absorption line pulses $a$, $b$ are of unequal amplitude, the polarity of the D. C. output voltage of comparator 16D depends upon which of the paired pulses $a$, $b$ is of greater amplitude and the amplitude of that voltage depends upon the magnitude of the amplitude difference of the pulses. Thus, the output $e_c$ of comparator 16D as appearing across terminals 69, 72 thereof, depends in polarity and magnitude upon the sense and extent of the frequency deviation of oscillator 12 from the transition frequency $\gamma_{ab}$ of the gas. By applying this voltage to a reactance tube, the frequency of oscillator 12 may be stabilized.

In the particular form shown in Fig. 5, the multivibrator 61A for supplying standard time-spacing pulses D to the coincidence detector 62A and standard time-spacing pulses E to the comparator 16D comprises a pair of tubes 73, 74 whose anodes and control grids are cross-connected by coupling condensers 75, 75. The output of tube 73 provides pulses E of repetition frequency $f_1$ supplied through filter 70A to comparator 16D.

The output of tube 74, differentiated by resistor-capacitor network 77, 78, is applied to input terminals 92, 93 of the coincidence detector 62A. The positive pulses are selected by rectifier 79 as the time-standard pulses D: if it is desired to use negative pulses, the differentiating network 77, 78 is included in the output circuit of tube 73 instead of tube 74 as shown.

The second multivibrator 60A, in the particular form shown in Fig. 5 for purpose of explanation, comprises a pair of tubes 80, 81 whose anodes and control grids are cross-connected by coupling condensers 82, 82. The control grids of tubes 80, 81 are also respectively coupled by capacitors 83, 83 to the anode circuit of a tube of multivibrator 61A. The output pulses of multivibrator 60A, which are of sweep-repetition frequency, are utilized to control the sweep-generator 20B, which in the particular exemplary form shown in Fig. 5, comprises a thyratron tube 84 whose control grid is coupled by capacitor 87 to the anode circuit of tube 81 and whose output circuit is suitably coupled to the sweep amplifier 63.

Though other types may be used, in the particular exemplary form shown in Fig. 5, the coincidence detector 62A comprises two pairs of diodes 85–86 with resistor-capacitor networks 90, 91 connecting the anodes of one pair and the cathodes of the other pair. The differentiated output of multivibrator 61A is applied to the input terminals of detector 62A to provide the standard time-space pulses D and to the other input terminals 94, 95 of the detector are applied the paired pulses *a*, *b* derived by demodulator 15 from the microwave energy transmitted through gas cell 10.

As coincidence detector 62A is of type requiring a push-pull input, there is interposed between its input terminals 94, 95 and demodulator 15, an inverter stage of known type including tube 96 having similar output resistors 97, 98 respectively disposed in its cathode and anode circuits. Thus, the unipolar pulses *a*, *b* applied to the control grid of tube 96 are converted to push-pull pulses for application through coupling capacitors 99, 99 to the input terminals 94, 95 of the coincidence detector 62A.

As above explained in discussion of Fig. 2, the output of the coincidence detector 62A, as appearing across integrating circuit 100 between output terminals 93, 101 of Fig. 5, is applied to sweep amplifier 63 to maintain that special observation interval $C'$ (Fig. 1B, Fig. 4C) for which the pulse comparator 16D need not be gated for valid comparison of the relative amplitude of pulses *a*, *b*.

Figure 6:
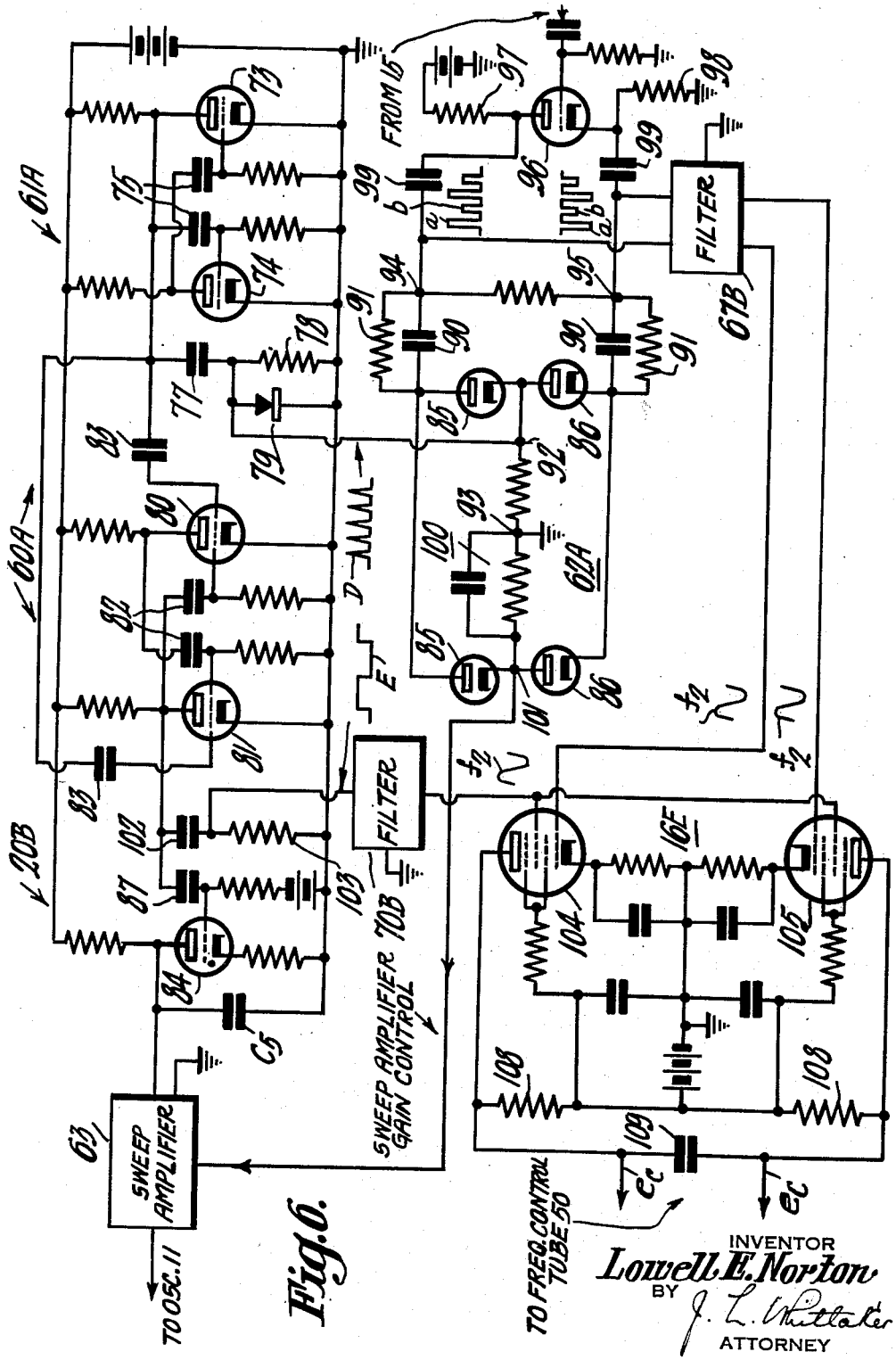

For a more detailed description of a system generically represented by Fig. 2 and utilizing relationship of Equations 11–15, reference is made to Fig. 6 in which groups of components corresponding with blocks in Fig. 2 are identified by the same reference numeral with change or addition of a suffix letter.

In the modification shown in Fig. 6, the standard time-space pulses D applied to the coincidence detector 62A are derived, as in Fig. 5, by differentiating the output of multivibrator 61A and selecting pulses of desired polarity by rectifier 79. However, the standard time-pulses E applied to the amplitude comparator 16E are derived, not from the multivibrator 61A, as in Fig. 5, but from the output of multivbrator 60A, through resistor-capacitor network 103, 102, As will appear from the following discussion, the filters 67B and 70B for applying standard time-space pulses to the pulse comparator 16E are tuned to pass the fundamental frequency Fourier component $f_2$ of multivibrator 60A (instead of double this frequency as in Fig. 5): the fundamental output waveform of these filters is substantially sinusoidal. The remainder of the circuits then operate on a variable amplitude basis (Equations 11–15) instead of on a variable phase basis (Equations 6–10), as in Fig. 5. The end result is the same in that the output of comparator 16E, like that of comparator 16D, is of polarity and magnitude dependent upon the difference in amplitude of the absorption-line pulses *a*, *b* and therefore suited for frequency control of oscillator 12.

Operation of Fig. 6 will be more easily understood by referring to Figs. 5*a* through 5*k* which show potentials appearing at important elements in the circuit.

As explained in discussion of Equations 11–15, where B (of Equations 1, 2) is the lowest frequency associated with the period $(T_a-T_a)=(T_a-T_b)+(T_b-T_a)$, the magnitude of the lowest frequency term $f_2$ is uniquely determined by the difference in amplitude of the paired absorption-line pulses *a*, *b* and the algebraic sign of that term depends upon which of the paired pulses is the larger. This relationship is true provided the absorption interval or sweep range is maintained at that value for which, as in Figs. 1B and 4C, the observation interval $C'=2(T_a-T_b)$. Such relationship is maintained by coincidence detector 62A, or equivalent, as previously explained in discussion of Figs. 2 and 5. With this condition established, the comparison of the amplitudes of pulses *a*, *b*, is effected by comparator 16E, or equivalent, without need for gating of it.

The amplitude comparator of Fig. 6 may be of any suitable type, including 16D of Fig. 5, or it may be of the type shown in Fig. 6 in which the standard pulses derived from pulses E of multivibrator 60A are applied in phase to the No. 3 grids of pentodes 104, 105. The absorption line pulses *a*, *b* from demodulator 15 are applied out-of-phase or in push-pull to the No. 1 grids of those tubes. The outputs of these two tubes are integrated by the resistor-capacitor networks 108, 109 and the differential of those outputs, which is of polarity and magnitude dependent upon the relative amplitude of the paired absorption line pulses *a*, *b*, may be applied to stabilize the operating frequency of oscillator 12 at the frequency for which the relative amplitude of pulses *a*, *b* is unity, in which case the oscillator frequency is the same as the lower transition frequency $\gamma_{ab}$ of the gas cell 10.

Figure 7:
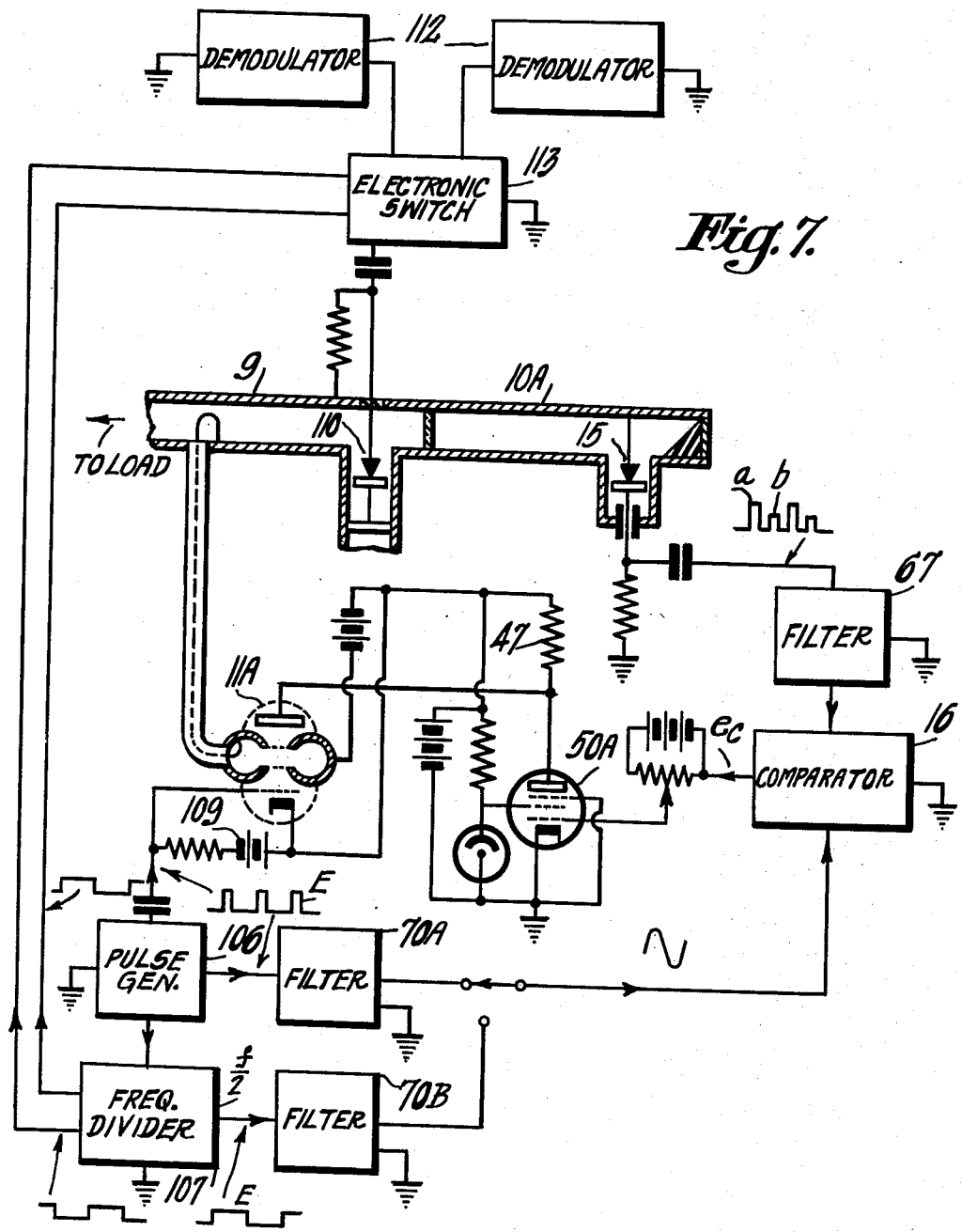
Fig. 7 is a block diagram of a system for controlling the frequency of a pulsed microwave oscillator.

In Figs. 2, 5 and 6, above discussed, the pulse-comparison invention herein claimed per se is shown as a component of an oscillator-frequency control by resonant-modulation, gas-absorption lines broadly claimed in aforesaid copending application Serial No. 148,481 which also discloses amplitude-comparators which, unlike those herein claimed, require gating. In Fig. 7 hereof, there is shown application of the present invention to another control of oscillator-frequency, described and claimed in copending application Serial No. 194,442, which does not utilize the phenomenon of resonance-modulation, but which also produces, in manner herein shortly described, paired non-coincident pulses whose relative amplitude varies with frequency deviations of an oscillator.

Figure 8:
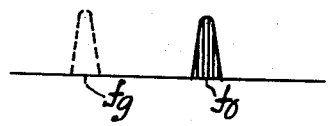
Figs. 8, 9A to 11C are explanatory figures referred to in discussion of Fig. 7.

In Fig. 7, the klystron 11A generically represents a microwave oscillator periodically switched on and off by pulse generator 106 to supply pulsed-modulated microwave energy to an antenna or other load for use, for example, in object location or navigational aid systems. When so modulated, the output of the oscillator 11A, as indicated in Fig. 8, is specular and substantially symmetrical about the center frequency $f_0$ determined by operating parameters including the dimensions of the klystron cavity.

The control grid of klystron 11A may be negatively biased beyond cut-off by battery 109, or equivalent D. C. source, and is periodically turned "On" by positive pulses from pulse generator 106: alternatively, the control grid may be biased negatively by battery 109, or equivalent, to give normal output, and periodically turned "Off" by negative pulses from generator 106.

Part of the output of oscillator 10 is transmitted by a waveguide 9 or other suitable transmission line to a gas-absorption cell 10A containing, at suitably reduced pressure, ammonia or other gas which exhibits molecular resonance at a frequency $f_g$ (Fig. 8) suitably displaced from the desired operating frequency of oscillator 11A. In copending application Serial No. 786,736, there are identified many gases in addition to ammonia which exhibit molecular resonance at fixed frequencies in the microwave spectrum.

The output frequencies of modulator 112 under control of switch 113 are applied to mixer 110 alternately to modulate the microwave energy in advance of cell 10A at two frequencies $f_a$ and $f_b$ for the successive pulses.

The frequencies $f_a$, $f_b$ are high compared to the repetition rate of pulse generator 106 but low compared to the microwave frequency generated by oscillator 11A. For example, $f_a$ and $f_b$ may be near 10 mc./s.

When a pulse of the microwave energy is modulated at frequency $f_a$, there are produced upper and lower specular sidebands $f_{a1}$ and $f_{a2}$ (Fig. 9A) whose center frequencies are displaced from oscillator frequency $f_0$ by modulating frequency $f_a$. The modulating frequency $f_a$ is so selected that one or the other of these sidebands, specifically the lower for Fig. 9A, overlaps the absorption curve $f_g$ of the gas in cell 10A. When modulating frequency $f_b$ is applied, there are produced sidebands $f_{b1}$ and $f_{b2}$ (Fig. 9B) respectively higher and lower than the oscillator frequency and displaced therefrom by frequency $f_b$. The frequency $f_b$ is so chosen that, assuming oscillator 11A is at correct frequency, one of these sidebands, specifically the lower for Fig. 9B, falls on the opposite slope of the absorption curve $f_g$ of the gas.

Figure 9A:
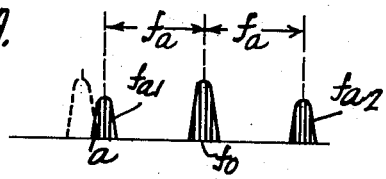
Figure 9B:
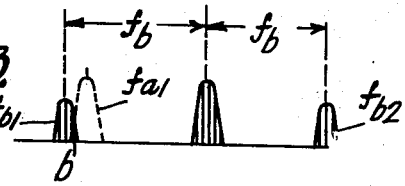
Figure 9C:
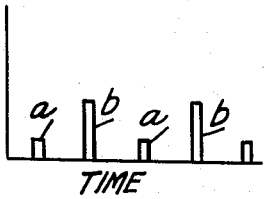

Comparing Figs. 9 and 9B, it is seen that the pair of lower sidebands $f_{a1}$ and $f_{b1}$ produced by the alternate modulation at frequencies $f_a$ and $f_b$ fall equally on opposite slopes of the absorption curve of the gas cell. Thus, when oscillator 11A is on proper frequency, the output of cell 10A as demodulated by rectifier 15 is a repeating series of pulses *a*, *b*, (Fig. 9C) all of equal amplitude.

Figure 10A:
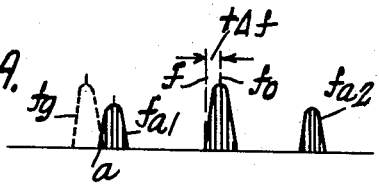

Assuming the frequency $f_0$ of the generated microwave oscillations drifts or shifts to a high frequency, all of the sidebands are similarly displaced in sense and to an extent corresponding with the positive frequency deviation $+\Delta f$. Thus, as shown in Fig. 10A, when modulating frequency $f_a$ is applied, the overlap of sideband $f_{a1}$ with the right-hand slope of the absorption curve of the gas is much less than for Fig. 9A whereas the overlap between the absorption curve and sideband $f_{b1}$, existent when modulating frequency $f_b$ is applied, is much greater in Fig. 10B than for Fig. 9B. Consequently, as shown in Fig. 10C, for this sense of deviation of oscillator frequency $f_0$, the output pulses *a* occurring during application of modulating frequency $f_a$ are smaller than the output pulses *b* occurring during modulation at frequency $f_b$.

Figure 11A:
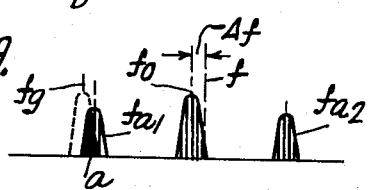
Figure 11B:
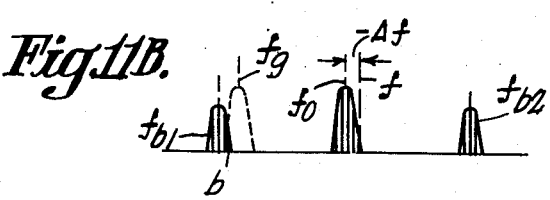

If, on the other hand, the frequency of oscillator 11A shifts to a lower frequency, the overlap of sideband $f_{a1}$ with the absorption curve $f_c$ is greater (Fig. 11A) than existent for null deviation of the oscillator frequency (Fig. 9A), and the overlap of sideband $f_{b1}$ with the absorption curve is less (Fig. 11B). Accordingly, for a negative frequency deviation $-\Delta f$, the pulses $a$ existent during modulation at frequency $f_a$ are greater in amplitude than pulses $b$ occurring during modulation by frequency $f_b$.

The electronic switch 113 which controls alternate application of modulating frequencies $f_a$ and $f_b$ is triggered at half the repetition rate of pulse generator 106 so that for successive "On" periods of oscillator 11A, the modulation frequency is alternately $f_a$ and $f_b$. By way of example, the triggering of switch 113 may be effected by frequency-divider square-wave generator 107 triggered by the pulse generator 106 to produce switching pulses $S_a$, $S_b$.

The pulse generator 106 must be stable or stabilized by a coincidence detector 62 as in systems previously herein described so that the time interval PI between the paired non-coincident output pulses $a$, $b$ of demodulator 15 is constant and equal to the time interval PPI between successive pairs of pulses.

The relative amplitude of pulses $a$ and $b$ then may be determined by utilization of either the phase-angle variation of a selected Fourier component of the pulse waveform (Equations 1–10) or the magnitude variation of another selected Fourier component of the pulse waveform (Equations 11–15). For the former (varying phase-angle component), the filter 67 interposed between the demodulator 15 and one input circuit of phase comparator 16 of Fig. 7 should have the frequency characteristic of filter 67A of Fig. 5; for the latter (varying magnitude component) it should have the frequency characteristic of filter 67B of Fig. 6. In both cases, the selected repetition frequency of the reference pulses E should be the same as that of the Fourier component selected by filter 67A or 67B from the pulse waveform $a$, $b$.

When the Fourier component whose magnitude variation is a measure of the relative amplitude of pulses $a$, $b$ is used the reference pulses E may be derived from frequency divider 108 of Fig. 7 and the frequency characteristic of the filter interposed between frequency divider 107 and the comparator 16 should have the same relationship to the switching frequency as exists between the filter 70B and the sweep repetition frequency in Fig. 6. When the Fourier component whose phase-angle variation is a measure of the relative amplitude of pulses $a$, $b$, is used the reference pulses E are derived from the output of pulse generator 106, and the pass frequency of the filter 70A interposed between it and the phase comparator 16 should have the same relationship to the frequency of generator 106 as exists in Fig. 5 between the repetition frequency of generator 61A and the pass frequency of filter 70A.

Figure 10B:
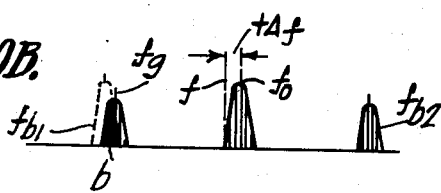
Figure 10C:
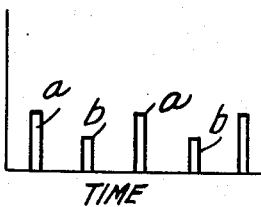

Under these circumstances, the output voltage of the phase-comparator 16 is zero for unity ratio of pulses $a$, $b$ existent for null frequency deviation of oscillator 11A as exemplified by Figs. 9A, 9B and 9C; is of one polarity for a positive frequency deviation corresponding with a smaller than unity ratio of pulses $a$, $b$ as exemplified by Figs. 10A, 10B and 10C; and if of reverse polarity for a negative frequency deviation corresponding with a greater than unity ratio of the pulses $a$, $b$ as exemplified by Figs. 11A, 11B and 11C.

For automatic stabilization of the frequency of oscillator 11A, the output voltage of the comparator 16 is applied to control the potential of a frequency-determining electrode of klystron 11A. Specifically, in the arrangement shown in Fig. 7, the output voltage $e_c$ of comparator 16 is applied to a grid of a control tube 50A effective to regulate the potential difference between the reflex anode and the cavity of the klystron. With change of the comparator output voltage, the current drawn by control tube 50A through resistor 47 is varied so to change the frequency-determining potential between the aforesaid electrodes of the klystron. This control-tube arrangement for changing the frequency of a klystron is more fully described in copending applications including my copending application Serial No. 29,836 and need not further be described.

In the systems thus far described, the paired non-coincident pulses whose relative amplitude is compared are produced by gas-line absorptions as the primary pulse sources, but it shall also be understood the non-gating amplitude comparison methods herein described and claimed are applicable for comparing pulses from other primary or secondary pulse sources including acoustic, optical magnetic, electrical and mechanical sources.

By way of said further example, in Fig. 12 the relative amplitude of pulses $a$ and $b$ is a measure of light intensities alternately impressed upon a photocell 114, or equivalent detector, from sources 115A, 115B by a light-switching device 116 which in the particular arrangement shown comprises two apertured disks or shutters 116A, 116B driven by motors 117A, 117B, or equivalent. The output of the detector 114, as amplified by a D. C. amplifier or as amplified by an A. C. amplifier 118 and rectified by rectifier 15, is a succession of pairs of non-coincident pulses $a$ and $b$ of like polarity.

If the objects 119A, 119B are mirrors, the relative amplitude of the pulses is a measure of the relative light-intensities of the sources 115A, 115B, the latter being a calibrated standard: if the objects 119A, 119B are respectively a sample and a standard, the relative amplitude of the pulses may be a measure of the mismatch of an optical characteristic such as color, reflection coefficient, or the like, using techniques of optics unnecessary here to discuss in further detail.

In any event, whatever may be the measured characteristic as determined by the nature of the optical system, the relative amplitude of pulses $a$ and $b$ is measured by selecting from the pulse waveform $a$, $b$ a Fourier component which varies in phase-angle or magnitude, as a function of the relative pulse-amplitude as explained in discussion of Equations 1 to 15. That component, as selected by filter 67, is impressed upon one input circuit of phase-comparator 16. Reference pulses E of the same frequency as the selected Fourier component and of fixed phase, as impressed upon the other input circuit of comparator 16, are derived from the light-switching. For example, motor 117B may drive a pulse generator 119 to produce, as in Fig. 7, time-reference pulses $S_a$, $S_b$ in synchronism with the switching. Specifically, the pulse generator 119 may comprise a cam 120 intermittently operating a switch including contact 121 to complete a circuit including battery 122 and impedance 123. The filter 70, in accordance with the preceding description of other exemplary systems, selects the proper Fourier component of the reference pulses. Filter 70 may be omitted if generator 119 is a small alternator having proper number of poles since its function is then also performed by the alternator.

As in all other arrangements herein described, the output $e_c$ of comparator 16 is zero for equal amplitudes of the pulses $a$, $b$ and for unequal amplitudes thereof is of sense and magnitude corresponding with the difference in pulse amplitudes.

The difference in amplitude may be measured by impressing the output of comparator 16 upon a suitable deflection meter 124 or by adjusting a calibrated slide-wire 125, in circuit with the standard source 115B, for null output of the comparator 16. The adjustment of slidewire 125 may be effected automatically by a servo system which in the particular arrangement shown comprises a reversible motor 126 controlled by a contacting-galvanometer 127 energized by the output of comparator 16.

The speed of motor 117B may be controlled by a second servo system including a coincidence detector 62, as in previously described modifications, to insure that the interval PI between the paired pulses $a$, $b$ is equal to the interval PPI between the successive pulse pairs to insure the waveform $a$, $b$ contains Fourier components which vary as a function of the relative amplitude of pulses $a$, $b$ as discussed in connection with Equations 1 to 15. The servo elements 128 may be a contacting-galvanometer and reversible motor arrangement similar to elements 126, 127 of the amplitude-comparison servo, or other type known to the art. The motor speed-control 129 adjusted by the servo may be a rheostat or other familar speed-control device. As in the other systems described, the coincidence detector 62 maintains equality of the intervals P, PPI between the pulses whose amplitudes are compared.

From the foregoing examples, utilization of the invention for pulse-amplitude comparison in direction-finding systems using either pulsed transmissions, or switching at the receiver, should be obvious; its application to alignment of two peaked response characteristics using sweeping or switching should also be apparent. In brief, the herein-described methods and arrangements for comparing the relative amplitude of paired non-coincident pulses is of general application.

What is claimed is:

1. The method of comparing the relative amplitude of paired non-coincident electrical pulses periodically recurring in successive observation intervals which comprises effecting equality of the time interval between the successive pulse pairs with the time interval between the paired pulses, selecting from the combined waveform of the pulses so equalized in time-spacing a single sinusoidal Fourier component of a multiple frequency including unity of the repetition frequency of said pulses which component varies in accordance with the relative amplitude of the paired pulses, producing time-standard pulses of repetition frequency having fixed numerical relation to that of said observation interval and equal to that of said selected Fourier component, and determining the phase-difference between said Fourier component and said time-standard pulses as a measure of the relative amplitude of the paired pulses.

2. A method as in claim 1 in which the selected Fourier component is one whose phase-angle varies in sign and magnitude in accordance with departure from unity ratio of the amplitudes of the paired pulses.

3. A method as in claim 1 in which the selected Fourier component is one whose amplitude is zero for unity ratio of the amplitude of the paired pulses and increases in opposite senses respectively for increasing and decreasing departures of said ratio from unity.

4. A method as in claim 1 in which the paired pulses are flat-topped and rectangular, in which the selected Fourier component is the fundamental frequency of the observation interval and in which the repetition frequency of the time-standard pulses is the same as the repetition frequency of the observation interval.

5. A method as in claim 1 in which the paired pulses are flat-topped and rectangular, in which the selected Fourier component is twice the fundamental frequency of the observation interval and in which the repetition frequency of the time-standard pulses is twice the repetition frequency of the observation interval.

6. A non-gating arrangement for determining the relative amplitude of paired non-coincident pulses recurring in successive observation intervals which comprises, a servo system for controlling the observation interval to maintain equality of the time intervals between paired pulses and that between pulse pairs, means for producing said paired non-coincident pulses, a phase-comparator having two input circuits, a filter to which said paired pulses are applied for selectively impressing upon only one of said input circuits of said phase-comparator a single selected sinusoidal Fourier component of the paired pulse waveform of a multiple frequency including unity of the repetition frequency of said pulses which component varies as a function of the relative amplitude of the paired pulses, and means for impressing upon the other input circuit of said phase-comparator time-standard pulses of frequency equal to that of said selected Fourier component whereby the output of said comparator is zero for equal amplitudes of said paired pulses and varies in sense and magnitude with departure from unity of the relative amplitude of the paired pulses.

7. An arrangement as in claim 6 in which the filter is of circuit parameters effecting selection of said Fourier component of the pulsed pair waveform whose phase-angle varies in sign and magnitude in accordance with departure from unity ratio of the amplitudes of the paired pulses.

8. An arrangement as in claim 6 in which a second servo system for controlling the relative amplitude of the paired pulses includes said comparator, said filter and said last-named means.

9. An arrangement as in claim 6 in which the servo system includes a phase-comparator, means for impressing said pulse pairs upon one of its input circuits, and means for impressing upon the other of its input circuits time-standard pulses of repetition frequency which is twice the repetition frequency of the observation interval.

10. An arrangement as in claim 6 in which the filter selectively passes a Fourier component of the paired pulse waveform whose frequency is twice the repetition frequency of the observation interval.

11. An arrangement as in claim 10 in which the servo system includes a phase-comparator, means for impressing the paired pulses upon one of its input circuits, and means for impressing upon the other of its input circuits time-standard pulses of repetition frequency equal to that of the Fourier component selected by the filter.

12. An arrangement as in claim 6 in which the filter selectively passes a Fourier component of the paired pulse waveform whose frequency is equal to the repetition frequency of the observation interval.

13. An arrangement as in claim 12 in which the servo system includes a phase-comparator, means for impressing the paired pulses upon one of its input circuits, and means for impressing upon the other of its input circuits time-standard pulses of repetition frequency which is twice the frequency of Fourier component passed by the filter.

14. A non-gating arrangement for controlling the frequency of an oscillator comprising a chamber confining gas having at least three permitted states of its molecule, means including a microwave oscillator for applying to said gas a microwave field of frequency corresponding with a transition frequency between two of said energy states, means for concurrently applying to said gas a radio-frequency field of frequency differing to predetermined extent from the oscillator frequency and corresponding with the transition frequency between a third energy state and one of said two energy states to produce selective absorption of the microwave energy at two resonant modulation frequencies respectively higher and lower than said first-named transition frequency, modulating means cyclically to sweep the frequency of said microwave oscillator through a microwave range including said two resonant modulation frequencies, means for demodulating the microwave energy passed by said gas to produce paired non-coincident pulses in successive sweep cycles, a phase-comparator, a filter in circuit between said demodulating means and one input circuit of said comparator for selectively passing a Fourier component of the paired pulse waveform which varies as a function of the relative amplitude of the paired pulses, means for impressing upon the other input circuit of said comparator time-standard pulses of frequency equal to said selected Fourier component, and means for applying the output of said comparator to a frequency-control of the first-named oscillator.

15. An arrangement as in claim 14 in which the swept range of microwave frequencies is controlled to maintain equality of the time spacing between paired pulses and equality of the time spacing between paired pulses and pulse pairs by a servo system including a second phase-comparator, means for impressing the paired impulses upon one input circuit thereof, and means for impressing upon the other input circuit thereof time-standard pulses of repetition frequency which is twice the sweep repetition frequency.

16. A non-gating arrangement for controlling the carrier frequency of a pulse-modulated oscillator comprising switching and modulating means for modulating successive output pulses of said oscillator alternately at two different frequencies for each switching cycle to produce sidebands having closely adjacent frequencies, a circuit element upon which said sidebands are impressed and which is sharply resonant at a fixed frequency substantially midway of said sideband frequencies for null deviation of the carrier frequency, means for demodulating the sideband energies transmitted by said circuit element to produce paired pulses in each switching cycle, a phase-comparator, a filter for selectively impressing upon one input circuit of said comparator a Fourier component of the paired pulse waveform which varies as a function of the relative amplitude of the paired pulses, means for impressing upon the other input circuit of said phase comparator time standard pulses of frequency equal to that of said Fourier component, and means for applying the output of said comparator to a frequency-control for said oscillator.

References Cited in the file of this patent

UNITED STATES PATENTS

| Number | Name | Date |
| --- | --- | --- |
| 2,065,565 | Crosby | Dec. 29, 1936 |
| 2,560,365 | Norton | July 10, 1951 |